April 2, 1968   G. POULOS   3,375,600
DISPLAY CONSTRUCTIONS WITH VARIABLE MOTIONS
Filed Jan. 11, 1965   3 Sheets-Sheet 1

INVENTOR
George Poulos
By McDougall, Hersh & Scott
Att'ys

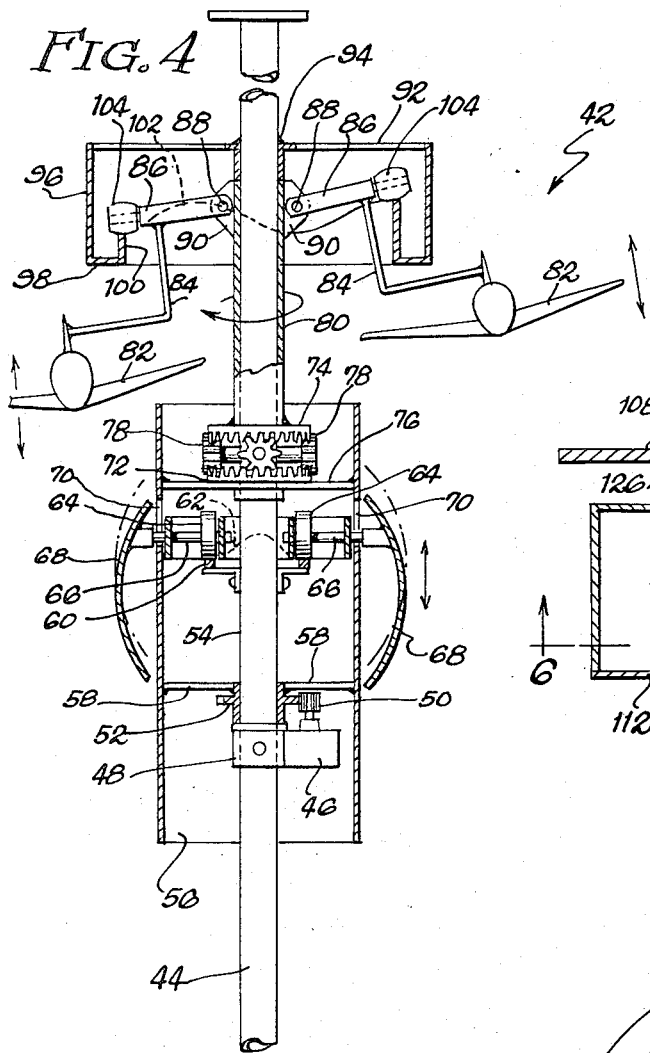
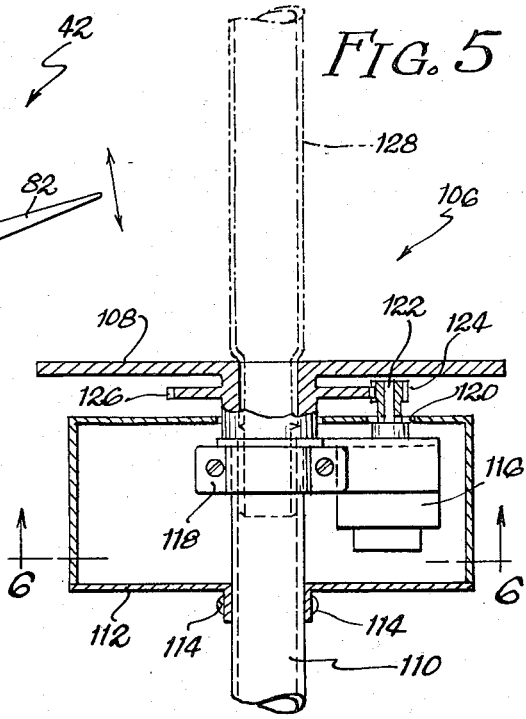
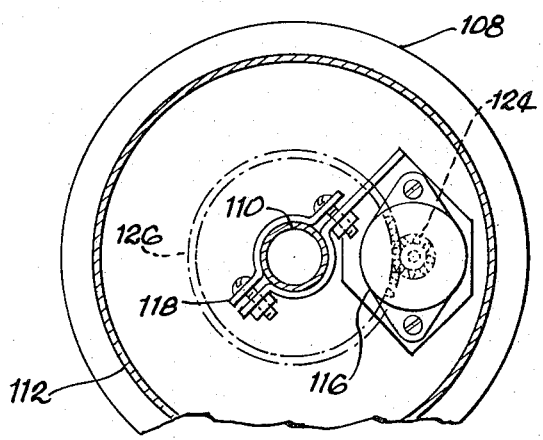

April 2, 1968 G. POULOS 3,375,600
DISPLAY CONSTRUCTIONS WITH VARIABLE MOTIONS
Filed Jan. 11, 1965 3 Sheets-Sheet 3
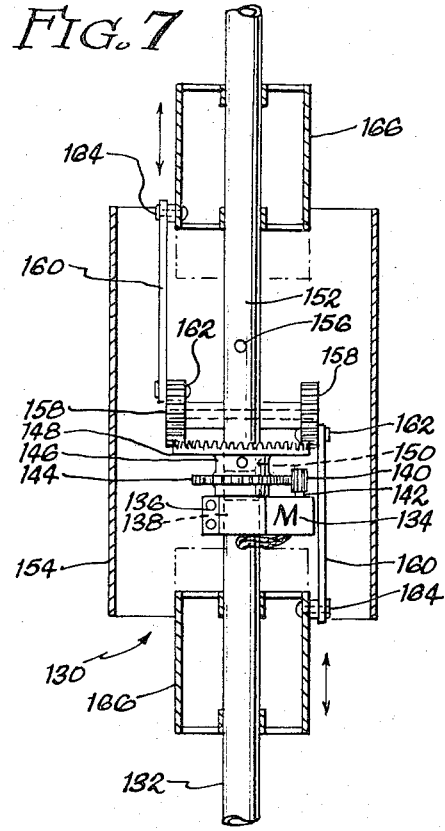
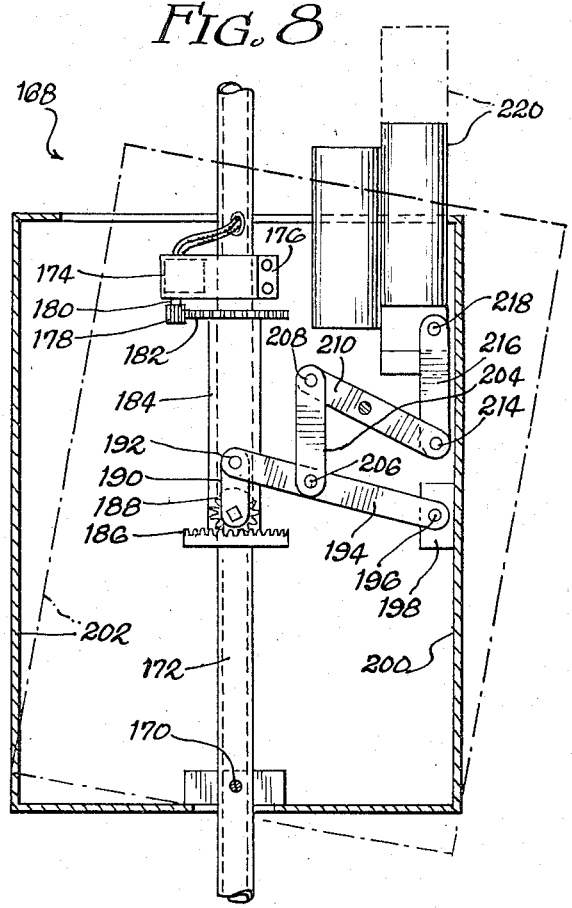
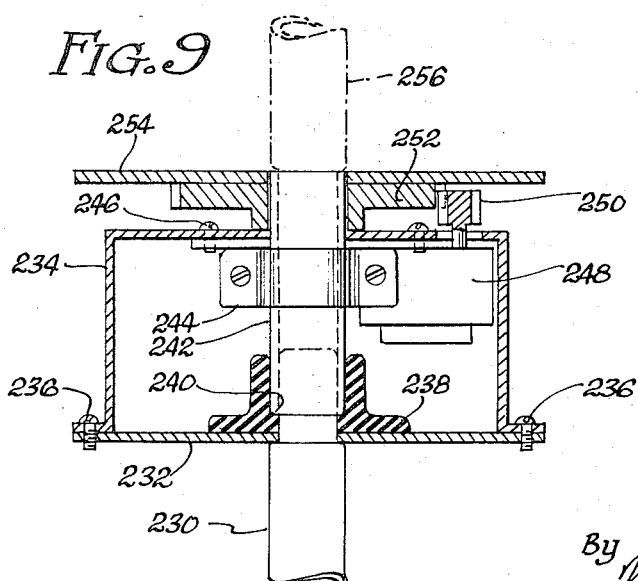
INVENTOR
George Poulos
By McDougall, Hersh & Scott
Att'ys Patented Apr. 2, 1968

3,375,600
DISPLAY CONSTRUCTIONS WITH VARIABLE MOTIONS
George Poulos, 3020 Pearl St., Franklin Park, Ill. 60131
Filed Jan. 11, 1965, Ser. No. 424,631
4 Claims. (Cl. 40—139)

ABSTRACT OF THE DISCLOSURE

Display constructions particularly including displays mounted on stationary poles which are supported at least at their bottom ends and which include drive mechanisms for the displays situated on the pole at a point remote from the bottom end. The display may include a first display mechanism having drive means attached thereto. The drive means are connected to a sleeve member situated around the pole and a second display is secured to the sleeve member. Undulating movement is provided by locating cam means on the pole which are engaged by the displays as they rotate around the pole.

---

This invention relates to display constructions of the type generally used for advertising purposes. In particular, the invention is concerned with display constructions which embody moving parts and which include motor means for imparting various motions to the displays.

The provision of displays for advertising purposes which will attract attention is extremely important to merchants and to others engaged in advertising. Various color combinations and materials of interest can be included on displays with a view toward getting the interest of individuals passing in proximity to the displays. However, the mere presence of eye-catching color combinations or material of interest is not entirely satisfactory, particularly where a large number of advertisements are located in generally the same area.

The use of moving displays is considered desirable since the movement tends to attract attention and the material on an advertisement will then be observed. Such displays have, however, proven unduly expensive particularly where the movement is sufficient to attract the attention of anyone present in the area of the display.

It is an object of the instant invention to provide display constructions which are characterized by moving parts uniquely suitable for attracting attention to the display.

It is a particular object of this invention to provide display constructions which combine a variety of movements of a particularly attractive nature whereby anyone in the vicinity of the display will be inclined to study the display more closely and to thereby observe the advertising material thereon.

It is an additional object of this invention to provide displays capable of achieving the foregoing objects and also characterized by relatively simple operating mechanisms so that the displays can be produced on an economical basis.

These and other objects of this invention will appear hereinafter and for purposes of illustration but not of limitation, specific embodiments of the instant invention are shown in the accompanying drawings in which:

FIGURE 4 is a fragmentary elevational view in section illustrating a display combining rotary, oscillating and undulating movement;

FIGURE 5 is a fragmentary elevational view in section of a mounting means for a motor suitable for use in combination with the displays of this invention;

FIGURE 6 is a plan view of the structure shown in FIGURE 5;

FIGURE 7 is a fragmentary elevational view in section illustrating a display combining rotary and vertical reciprocal movement;

FIGURE 8 is a fragmentary elevational view in section illuustrating a display combining rotary, oscillating and vertical reciprocal movement; and, FIGURE 9 is a fragmentary elevational view in section illustrating an alternative form of a display combining multiple movements.

The accompanying drawings illustrate various display constructions which embody certain novel features ideally suited for achieving the objects of this invention. It will be appreciated that the individual aspects of a particular example could in many cases be used alone or in combination with features of a separate example. Accordingly, the various novel features of the respective examples described herein should not be considered to be limited by the particular assembly which includes these features.

Figure 1:
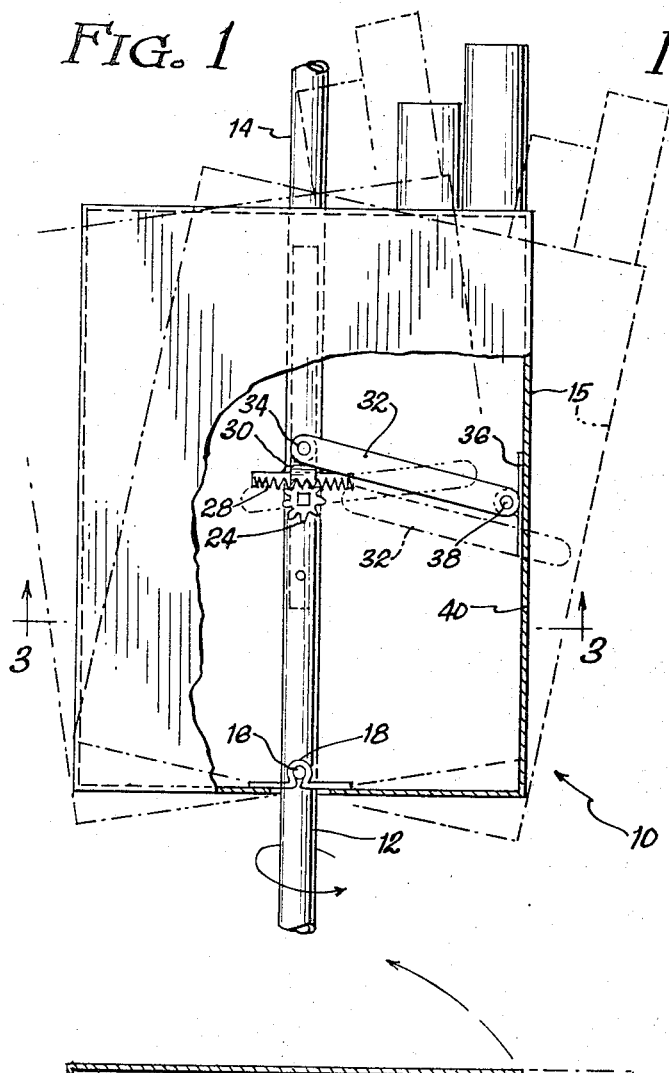
FIGURE 1 is a fragmentary elevational view, partly cut away, of a display combining rotary and oscillating movement.
Figure 2:
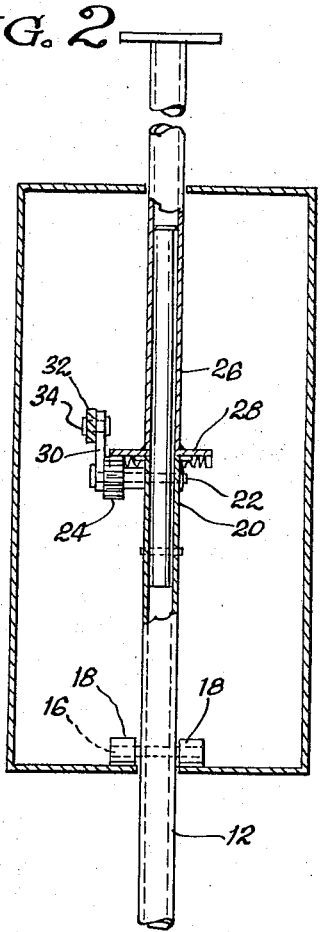
FIGURE 2 is a vertical sectional view of the display of FIGURE 1.
Figure 3:
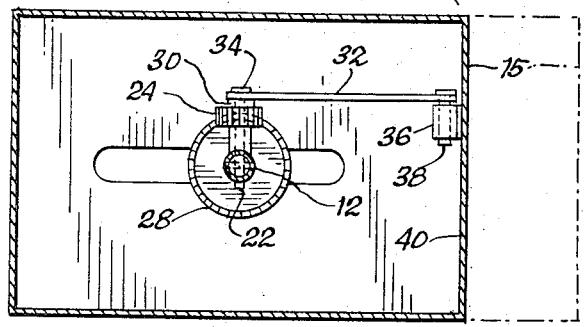
FIGURE 3 is a horizontal sectional view taken about the line 3—3 of FIGURE 1.

In FIGURE 1, there is illustrated a display 10 adapted to be mounted on pole sections 12 and 14. The section 12 is adapted to be rotated in the preferred form of the construction of FIGURE 1, and rotation of this pole section can be achieved in various ways. As an example of a means for rotating the pole section 12, reference is made to FIGURE 5 of this specification which will be described in detail hereinafter.

A display 14 is mounted for movement on the pole section. The construction is designed to provide for oscillation of the display and, accordingly, a pin 16 is formed in the pole section 12 and hinge members are associated with this pin. It will be appreciated that pivotal movement of the display about the pin 16 can be achieved with this arrangement.

The upper end 20 of the pole section 12 defines an opening for receiving shaft 22 which carries pinion 24. The pole section 14 is held stationary relative to the pole section 12, and the lower end 26 of the section 14 carries a crown gear 28. The teeth of the crown gear mesh with pinion 24 and, therefore, rotation of the pole section 12 will result in rotation of the pinion 24 as the pinion moves around the crown gear.

A rotary arm 30 is tied to the end of the shaft 22 and a link 32 is connected to this arm at 34. The other end of the link is attached to mounting member 36 at 38, and this member is in turn secured to the inside wall 40 of the display 10. As suggested by the dotted lines in FIGURE 1, the particular construction provides for an oscillating movement of the display as the pole section 12 rotates. This movement is, of course, combined with rotary movement whereby all portions of the display can be viewed in all directions while the oscillating movement serves to attract attention. In the embodiment shown, the display comprises a cigarette package although many other applications of this arrangement will be suggested.

FIGURE 4 illustrates a display construction 42 which is mounted on pole section 44 which is preferably fixed to a stationary horizontal surface. A motor 46 is attached to the section 44 by means of a clamp 48, and this motor drives a pinion 50. The pinion meshes with a gear 52 which is tied to a second pole section 54. A cylindrical display 56 is attached to the section 54 by means of tie rods 58. Accordingly, rotary movement effected by the motor 46 will result in rotation of the display 56 about a vertical axis.

A cam member 60 is also tied to the pole section 54. This member defines a cam surface 62 which comprises hills and valleys. Cam followers in the form of rollers 64 ride over the surface 62, and this results in vertical reciprocation of the shafts 66 which carry the rollers. Displays 68 are secured outwardly of the display 56 and vertical openings 70 are defined by the latter. These openings receive the shafts 66 whereby vertical reciprocation of the displays 68 can be achieved. It is again pointed out that this action is accomplished in combination with the rotary action resulting through rotation of the pole section 54.

The construction of FIGURE 4 includes an additional feature accomplished by reason of crown gears 72 and 74. The crown gear 72 is carried on cross member 76 and is attached to the pole section 54. Pinions 78 are interposed between the crown gears whereby rotation of the pole section 54 will result in rotation of the crown gear 72 and opposite rotation of the crown gear 74. The crown gear 74 is tied to sleeve 80 which thus rotates about the pole section 54.

A display including planes 82 is attached to the sleeve 80. Undulating movement simulating flying action is accomplished by the arrangement illustrated. The arrangement includes members 84 which secure the planes to arms 86. The arms 86 are pivotally connected at 88 to brackets 90 attached to the sleeve 80. A housing 92 is fixed to the pole section at 94 whereby the sleeve 80 rotates relative to the housing. The housing includes downwardly extending side walls 96 and inwardly extending flange 98 and a return portion 100 which defines cam surface 102. Cam followers in the form of rollers 104 are attached to the arms 86, and these cam followers ride over the cam surface 102. The relative rotation of the housing 92 and the sleeve 80 which carries the planes 82 provides the desired undulating movement.

The construction 106 shown in FIGURE 5 is particularly designed for the rotation of a turntable 108 mounted at the top of pole section 110. The pole section is preferably stationary, and it includes a housing 112 fixed thereto by means of screws 114. Included within the housing is a motor 116 attached to the pole by means of a clamp 118. An opening 120 is defined by the housing 112 and the shaft 122 of the motor extends through this opening. A pinion 124 is tied to the shaft, and this pinion meshes with gear 126 formed integrally with the turntable 108.

The arrangement of FIGURE 5 is particularly desirable since it can be applied to a pole in an extremely simple fashion. Furthermore, the driving elements for the arrangement are almost completely enclosed within the housing 112 whereby the construction will not present an unsightly appearance. The combination of the appearance of the construction and the simple means for attaching the construction to a stationary pole are of prime consideration when the reason for the display is considered. Thus, merchants would not employ an unattractive construction and would not utilize a construction which required substantial assembly operations. In addition, it should be noted that the pole sections which are utilized may comprise sections of the type commonly used for pole lamps and similar items. The pole sections are relatively inexpensive and can be readily set up and held in place by conventional means such as resilient end members. The arrangement of FIGURE 5 completely eliminates the need for stands which conceal drive mechanisms at the underside of the pole section.

It will be noted that the arrangement of FIGURE 5 may include an additional pole section 128. This section rests on the turntable 108 and, accordingly, it will rotate with this table. The arrangement of FIGURE 1 can, thus, be achieved by utilizing a drive mechanism such as shown in FIGURE 5.

FIGURE 7 illustrates a display assembly 130 which is mounted on a fixed pole 132. A motor 134 is attached by means of a clamp 136 to the upper end 138 of the pole section. Pinion 140 is carried by the shaft 142 of the motor, and this pinion meshes with gear 144 for driving rotary member 146. A crown gear 148 is associated with the rotary member, and the rotary member is tied to the lower end 150 of rotary pole section 152. A display 154 is secured to the section 152 by means of a rod 156 which extends through the pole section into securing engagement with the display 154. Obviously, with this arrangement, the display will rotate around in response to the driving action of the motor 136.

A pair of gears 158 are mounted in meshing relationship with crown gear 148. Arms 160 are pivotally connected at 162 to the gears 158, and the opposite ends of these arms are connected at 164 to display members 166. The display members 166 define central openings whereby one of the displays can be slideably received on the pole section 132 while the other is slideably received on the pole section 152. As the gears 158 rotate, the displays 166 will reciproate up and down due to the action of the arms 160. In addition to this vertical reciprocation, which includes entry at least in part within the display 154, the displays 166 are subjected to rotary movement. It will be apparent that this combination provides a unique arrangement of relatively movable members to provide maximum viewing surfaces as well as attention-getting characteristics.

FIGURE 8 illustrates a display 168 which is pivotally connected at 170 to fixed pole section 172. A motor 174 is attached to the pole section by means of clamp 176, and a pinion 178 is driven through its connection with the shaft 180 of the motor. A gear 182 is associated with sleeve 184, and this gear meshes with the pinion 178 whereby rotation of the sleeve can be achieved.

A crown gear 186 is attached at the lower end of the sleeve, and this gear meshes with pinion 188. The pinion provides for the rotation of arm 190 which is connected to one end 192 of connecting arm 194. The other end 196 of the arm is connected to the bracket 198 which is secured to the inner wall 200 of the display element 202.

A link 204 is attached to an intermediate point 206 of the arm 194 and this link is operatively connected at 208 to crank 210. The crank is pivotally mounted to a pin 212 connected to the display element 202. An end 214 of the crank is attached to arm 216 which is in turn connected at 218 to an additional display element 220.

When the drive motor 176 of FIGURE 8 is made operative, the sleeve 184 will rotate to thereby effect rotary movement of arm 190 through gears 186 and 188. The connection of the arm 190 with the arm 194 will cause oscillating movement of the display 202. In addition, the connection between the arm 194 and the crank 210 will result in vertical reciprocation of the display element 220. As suggested by the drawing, this arrangement is ideally suited for a cigarette package since a replica of the cigarettes can be moved in and out of the package while the package itself oscillates, the whole arrangement being particularly effective for attracting attention.

In the construction of FIGURE 9, a pole section 230 is provided for supporting a plate member 232 which forms a bottom for motor housing 234. The plate and housing are connected by means of screws 236.

An annular member 238 surrounds the pole section 230, and this member defines an annular shoulder 240 which forms a seat for a cylindrical member 242. The member 238 is preferably of hard rubber or a similar resilient material whereby the cylinder 242 can be pressed into engagement therewith to hold the cylinder snugly in place.

A motor bracket 244 is attached to the top of the housing by means of screws 246. The motor 248 operates to drive a pinion 250 which meshes with gear 252. Turntable 254 is integrally formed or otherwise attached to the gear 252 whereby the entire assembly can effect the desired movement for display purposes. An upper pole section 256 can be optionally provided where a pole lamp effect is to be utilized.

It will be obvious that many of the features described can be incorporated in various other displays and that modifications of the specific examples can also be easily made. In FIGURE 1, the pole section 12 could be fixed and the section 14 rotated whereby oscillating movement only of the cigarette package would result. As a further example, the pole section 172 of FIGURE 8 could be rotated as by means of the structure of FIGURE 5 to combine rotary movement with the other arrangements described.

In any of the illustrated displays, a wide variety of additional display elements could be attached in various positions. On a turntable such as the table 108 of FIGURE 5, material could be carried on top of the table, hung from beneath the table or attached at its peripheral edges. In an arrangement such as shown in FIGURE 4, additional display means, such as signs, can be attached in various points particularly to conceal the top of the pole sections where these are exposed.

In the various examples, intermeshing gears have been utilized for achieving the desired driving section. It will be understood that friction drive means can readily be employed in place of gears and references in the following claims should be construed to cover such drive means as well as other conventional arrangements.

It will be understood that various other changes and modifications can be made in the above described constructions which provide the characteristics of this invention without departing from the spirit thereof particularly as defined in the following claims.

That which is claimed is:

1. In a display construction comprising a stationary pole mounted to extend outwardly from a surface, the improvement comprising a first drive means clamped to the outside of a first section of said pole at a point remote from said surface, a first display operatively connected to said first drive means, said first drive means operating to rotate said first display about said first pole section, a second drive means connected to said first display, a sleeve fitted around a second adjacent section of said pole, said sleeve being connected to said second drive means whereby said second drive means operates to rotate said sleeve about said second pole section, second display means attached to said sleeve for rotation therewith, and means fixed on said second pole section and engaging said second display means for imparting undulating movement to said second display means as the second display means rotates about the axis of said pole.

2. A construction in accordance with claim 1 wherein said second drive means comprises gear means associated with the first display means adapted to rotate therewith, said sleeve having second gear means operatively connected to said first mentioned gear means for imparting rotary movement to said sleeve.

3. A construction in accordance with claim 2 wherein said second display means includes pivotally mounted arms, the means for imparting undulating movement to said second display means comprising a cam surface adapted to be engaged by said arms whereby rotation of said sleeve means causes pivotal movement of said arms as they ride over said cam surface.

4. A construction in accordance with claim 3 wherein said first display means includes members adapted to reciprocate during turning of the first display means, a cam means attached to said first pole section and cam followers attached to said members whereby rotation of said first display means will cause said cam followers to ride over said cam means for imparting reciprocating movement to said members.

References Cited

UNITED STATES PATENTS

| | | | |
|---|---|---|---|
| 1,584,777 | 5/1926 | Kaiser et al. | 40—33 |
| 1,618,359 | 2/1927 | Vitolo | 40—33 |
| 2,791,427 | 5/1957 | Johnson | 272—31 |
| 3,147,566 | 9/1964 | Ong | 46—119 |

FOREIGN PATENTS 1,133,231  11/1956  France.

LAWRENCE CHARLES, *Primary Examiner.*